United States Patent [19]

Ito

[11] Patent Number: 5,370,930

[45] Date of Patent: Dec. 6, 1994

[54] LAMINATED POLYESTER FILM

[75] Inventor: Yoshihiko Ito, Yokohama, Japan

[73] Assignee: Diafoil Hoechst Company, Ltd., Tokyo, Japan

[21] Appl. No.: 972,562

[22] Filed: Nov. 6, 1992

[30] Foreign Application Priority Data

Nov. 7, 1991 [JP] Japan .................................. 3-291771

[51] Int. Cl.$^5$ .................. B32B 27/36; B29C 55/12
[52] U.S. Cl. .................. 428/335; 264/211.12; 264/211.19; 264/211.2; 427/387; 427/388.2; 427/388.4; 428/336; 428/447; 428/451; 428/480; 428/483; 428/910
[58] Field of Search ............... 428/447, 451, 480, 483, 428/335, 336, 910; 525/100, 479; 264/211.12, 211.19, 211.2; 427/387, 388.2, 388.4

[56] References Cited

U.S. PATENT DOCUMENTS

| | | | |
|---|---|---|---|
| 4,766,038 | 8/1988 | de Vroom | 428/447 |
| 5,128,206 | 7/1992 | Fiard et al. | 428/337 |

FOREIGN PATENT DOCUMENTS

| | | |
|---|---|---|
| 0189978 | 8/1986 | European Pat. Off. . |
| 55-007467 | 1/1980 | Japan . |
| 57-074195 | 5/1982 | Japan . |
| 58-146065 | 8/1983 | Japan . |
| 58-171992 | 10/1983 | Japan . |
| 58-187396 | 11/1983 | Japan . |
| 60-094390 | 5/1985 | Japan . |
| 60-151096 | 8/1985 | Japan . |
| 2269133 | 11/1990 | Japan . |
| 3099827 | 4/1991 | Japan . |
| 0445744 | 9/1991 | Japan . |
| 57-129789 | 8/1992 | Japan . |

*Primary Examiner*—D. S. Nakarani
*Attorney, Agent, or Firm*—Foley & Lardner

[57] ABSTRACT

A polyester film having a coating layer provided with excellent mold release property, slipperiness, heat resistance and flatness is disclosed.

The laminated polyester film is prepared by applying at least on one surface of a polyester film an aqueous solution or dispersion containing a polysiloxane-polyvinyl graft copolymer which comprises a silane comprising structural units of the formulas (1) and (2) indicated below or the hydrolysate thereof and in which not less than 80 wt % of the siloxane portions are dimethylsiloxane, and, thereafter, stretching and drying.

$$R^1_n SiO_{(4-n)/2} \quad (1)$$

$$R^2_m SiO_{(3-m)/2}{-}A{-}B \quad (2)$$

wherein $R^1$ and $R^2$ are respectively and independently an unsubstituted or substituted hydrocarbyl group which has a carbon atom directly connected to the Si atom and has no radical polymerizability; n is 1 or 2 and when n is 2 $R^1$'s may be different groups; m is 0 or 1; A is a divalent organic group which has a carbon directly connected to the Si atom and is connected to the group B; and B is a vinyl copolymer block obtained by grafting at least one selected from an aromatic vinyl monomer and an alkyl ester of acrylic or methacrylic acid.

13 Claims, No Drawings

LAMINATED POLYESTER FILM

FIELD OF THE INVENTION

The present invention relates to a polyester film, more particularly, to a biaxially stretched polyester film which has coating layer and is provided with improved mold release property, slipperiness and heat resistance.

BACKGROUND OF THE INVENTION

Biaxially stretched polyester films, especially biaxially stretched poly(ethylene terephthalate) films, have excellent transparency, dimensional stability, mechanical properties, electrical characteristics, gas barrier property, heat resistance, chemical resistance, etc. and, therefore, widely used as base materials for packaging, electric insulation, photography, drawing, electronic photography, magnetic recording, condensers, thermal transfer printing, etc. in various fields.

When polyester films are used as industrial base materials or final consumer products, however, polyester films are poor in slipperiness and apt to cause blocking with plastics and metals. Thus good mold release property, slipperiness and heat resistance are desired in polyester films. Under the circumstances, it is tried to provide polyester films with a coating layer to give such properties.

For instance, it has been proposed to provide the surface of a base film which contact the thermal head with a layer of a thermoplastic or thermosetting resin containing a lubricant or a mold release agent such as a surfactant, silicone oil, etc. as a stick prevention layer (Laying-Open Patent Publication Nos. 57-129789, 58-171992, 58-187396, 60-94390, 60-151096, etc.) or with a layer of a heat resistant resin such as silicon resins (Laying-Open Patent Publication Nos. 55-7467, 57-74195, etc.)

Although the sticking can be prevented by such a stick prevention layer, the lubricant or mold release agent bleeds out of the stick prevention layer to the surface and contaminates the thermal head causing adhesion of dust resulting in poor printing (skipping) or the lubricant or mold release agent is transferred to the back side of the film which has been wound up as a roll and impairs tight contact between the base film and the thermal transfer ink layer or to the recording paper. Also the adhesion of the base film and the stick prevention layer is insufficient and peel-off of the stick prevention layer causes contamination of the thermal head inviting poor printing (skipping). Further, in the techniques of the above described patent publications, there are defects that the layer is thick and apt to be uneven. When a thermosetting resin such as a silicon resin is used, a high temperature is required for drying, which causes thermal damage of the base film impairing the flatness of the film, which means deterioration of the product quality.

Also good slipperiness is required for the friction sheet (retainer sheet) placed inside of audio cassette tape recorders, which house magnetic recording tape. Insufficient slipperiness increases winding torque, which makes the running of the tape irregular causing wow and flattering, that is, poor sound quality in replaying. In rapid winding and rewinding, irregularity of running may stop the film in an extreme case. For remedy of this defect, it has been proposed to provide biaxially stretched polyester films with a layer containing a lubricant (Laying-Open Patent Publication No. 58-146065).

In the same way as in the case of thermal transfer printing, however, the lubricant layer is thick and, therefore, it is difficult to form a layer of a uniform thickness and that the flatness of the base film is impaired when coated films are dried. Further the layer is apt to pick up dust. Also the sticking of the lubricant, which bled out, to the back side of the wound-up film causes repellence of the printing ink when the printing is effected on the back side of the friction sheet and thus the adhesion of the printed layer to the polyester layer is poor resulting in poor printing.

In the transfer printing, which is a representative method for printing images, characters and wood grains, etc. on the surface of molded plastic products, good inter-layer adherence, easy separation of the layer to be transferred and good surface property of the transferred are required. It has been known that the substrate film is laminated with a coating or a film of a curable silicon resin having mold release property in order to give the film the mold release property.

Laminating a curable silicon resin layer, however, has problems that the coating layer is thick, the thickness is apt to be nonuniform, curing requires a high temperature, and the flatness of the film is impaired as described above resulting in poor productivity and high cost of the products. Further, there is a problem that the silicon resin has too good a mold release property and, therefore, the transferred layer easily peels off in the steps other than the transfer printing.

The present invention is to provide an inexpensive biaxially stretched polyester film having a coating layer provided with excellent mold release property, slipperiness, heat resistance, flatness and non-sticking to the back side when wound up.

DISCLOSURE OF THE INVENTION

The gist of the present invention resides in a laminated polyester film prepared by applying at least on one surface of a polyester film an aqueous solution or dispersion containing a polysiloxane-polyvinyl graft copolymer which comprises a silane comprising structural units of the formulas (1) and (2) indicated below or the hydrolysate thereof and in which not less than 80 wt % of the siloxane portions are dimethylsiloxane, and, thereafter, stretching and drying.

$$R^1{}_n SiO_{(4-n)/2} \tag{1}$$

$$R^2{}_m SiO_{(3-m)/2}-A-B \tag{2}$$

wherein $R^1$ and $R^2$ are respectively and independently an unsubstituted or substituted hydrocarbyl group which has a carbon atom directly connected to the Si atom and has no radical polymerizability; n is 1 or 2 and when n is 2, $R^1$'s can be different groups; m is 0 or 1; A is a divalent organic group which has a carbon atom directly connected to the Si atom and is connected to the group B; and B is a vinyl copolymer block obtained by grafting at least one selected from an aromatic vinyl monomer and an alkyl ester of acrylic or methacrylic acid.

Now the invention will be described in detail below.

Preferred polyesters used as polyester film in the present invention are poly(ethylene terephthalate) in which not less than 80 mol% of the structural units is ethylene terephthalate, poly(1,4-cyclohexanedimethylene terephthalate) in which not less than 80 mol% is 1,4-cyclohexanedimethylene terephthalate or poly(ethylene 2,6-naphthalate) in which not less than 80 mol% of the structural units is ethylene 2,6-naphthalate. Diol monomers such as ethylene glycol, propylene glycol, butylene glycol, hexamethylene glycol, neopentyl glycol, 1,1-cyclohexane dimethanol, 1,4-cyclohexane dimethanol, diethylene glycol, triethylene glycol, polyalkylene glycol, pentaerythritol, etc.; dicarboxylic acids such as terephtahlic acid, isophthalic acid, adipic acid, azelaic acid, sebacic acid, 2,6-naphthalene dicarboxylic acid, 4,4'-diphenyldicarboxylic acid, 4,4'-diphenyldisufonedicarboxylic acid, 4,4'-diphenyletherdicarboxylic acid, etc.; ester forming derivatives thereof; and hydroxycarboxylic acids such as hydroxybenzoic acid, etc. can be copolymerized with the above-described polyester monomers.

The polyester films used in the present invention can contain inorganic particles, organic particles, organic lubricants, antistatic agents, stabilizers, pigments, dyes, organic high polymers as desired. When the polyester film is used for thermal transfer printing, inorganic or organic particles are incorporated as desired in order to roughen the surface of the film for adjustment of the gloss of transferred images, improvement of the running property in manufacturing of thermal transfer printing materials and in printing, etc.

The thickness of the polyester film used for the present invention is suitably selected considering strength, thermal conductivity, operability, productivity, etc. When it is used for thermal transfer printing materials, the preferred thickness is 2-20 μm. Too thin films are poor in productivity and too thick films do not exhibit advantage of the polyester film. When it is used for friction sheet, the preferred thickness is 20-100 μm. Too thin films are not easy to mount on the cassette. Unnecessarily thick films have no advantage. When the film is used for mold release films, the preferred thickness is 5-250 μm. Too thin films are not easy to handle in transfer printing operation. Unnecessarily thick films have no advantage.

The polysiloxane-polyvinyl copolymer used in the present invention comprises silanes having structural units (1) and (2) as described above and hydrolysate thereof.

$$R^1_n SiO_{(4-n)/2} \quad (1)$$

$$R^2_m SiO_{(3-m)/2}-A-B \quad (2)$$

wherein $R^1$ and $R^2$ are respectively and independently an unsubstituted or substituted hydrocarbyl group which has a carbon atom directly connected to the Si atom and has no radical polymerizability; n is 1 or 2 and $R^1$'s can be different when n is 2; and m is 0 or 1. Examples of the hydrocarbyl group are hydrocarbyl groups including monovalent alkyl groups such as methyl, ethyl, propyl, butyl, 2-ethylhexyl, lauryl, etc.; aryl groups such as phenyl, tolyl, xylyl, naphthyl, etc. as well as those hydrocarbyl groups in which the hydrogen atoms connected to carbon atoms are partly or wholly substituted with halogen, amino, epoxy, ureide, cyano, hydroxy, carboxyl, sulfonate or salt thereof.

A is a divalent organic group which has a carbon atom directly connected to the Si atom and is connected to the group B. Examples of this organic group are radical-reactive groups such as vinyl, allyl, β-acryloxyethyl, β-methacryloxyethyl, gamma-acryloxypropyl, gamma-methacryloxypropyl, β-mercaptoethyl, gamma-mercaptopropyl, etc.

B is a vinyl copolymer block obtained by grafting at least one vinyl monomer selected from aromatic vinyl monomers and alkyl esters of acrylic or methacrylic acid. Examples of the aromatic vinyl monomer are styrene, α-methylstyrene, vinyltoluene, p-ethylstyrene, etc. Examples of the alkyl ester of acrylic acid or methacrylic acid are alkyl (meth)acrylate (which means acrylate or methacrylate, and the same hereinafter) such as methyl (meth)acrylate, ethyl (meth)acrylate, propyl (meth)acrylate, butyl (meth)acrylate, benzyl (meth)acrylate, hexyl (meth)acrylate, octyl (meth)acrylate, 2-ethylhexyl (meth)acrylate, lauryl (meth)acrylate, etc. and alkoxyalkyl (meth)-acrylate such as methoxyethyl (meth)acrylate, butoxyethyl (meth)acrylate, etc.

The vinyl monomer which is to be copolymerized with said vinyl monomers are preferably compounds having functional groups such as reactive functional groups, hydrophilic groups, self crosslinking functional groups, etc. By introducing monomeric units having specific functional groups, polymers, which are water-soluble or water-dispersible and which maintain such properties can be well obtained. Moreover, properties such as adhesiveness with the polyester film, resistance to water, chemical resistance, non-stickiness, mechanical strength of the coating layer can be improved. In addition, two or more species of functional groups can be contained in the compounds of the invention.

Examples of the monomer are compounds having carboxyl groups or salts or anhydrides thereof such as (meth)acrylic acid, iraconic acid, maleic acid, fumaric acid, maleic anhydride; compounds having hydroxyl group such as β-hydroxyethyl (meth)acrylate, β-hydroxypropyl (meth)acrylate, β-hydroxyvinylether, polyethyleneglycol mono(meth)acrylate, etc.; compounds having alkylol group, amino group, alkylolated amino group or salt thereof such as dimethylaminoethyl (meth)acrylate, diethyl-aminoethylvinylether, 3-aminopropylvinylether, dimethylaminoethylvinylether and those which are quaternized, etc.; compounds having amino group or alkylolated amido group such as acrylamide, N-methylacrylamide, methylolated methacrylamide, ureidovinylether, ureidoethyl acrylate, etc.; and compounds having sulfonic acid group or salt thereof such as vinylsulfonic acid, styrenesulfonic acid, etc. In addition to the above vinyl monomer compounds, acrylonitrile, butylvinylether, mono or dialkyl esters of maleic acid, vinyl chloride, vinylpyridine, vinylpyrolidone, etc. can be used in combination with the former.

In the graft copolymer of the present invention, preferably not less than 80 wt % of the siloxane portions are dimethylsiloxane. With less than 80 wt %, the crosslinking degree is high and formation of coating on the surface of a film is difficult.

The ratio of the siloxane portions and the vinyl polymer portions is preferably 100 parts by weight: 5-2000 parts by weight. If the siloxane portions are small, slipperiness and mold release property are poor. If the siloxane portions are too large, adhesivity of the coating layer to the polyester substrate is inferior and peel-off of the coating layer will be caused or sticky feeling will appear.

Preparation of the graft copolymer of the present invention can be conducted as follows. First, a compound of formula (1) and a compound of formula (2) in which the vinyl polymer blocks are yet not introduced are hydrolyzed in an aqueous medium with the aid of a hydrolyzation catalyst such as an acid or an alkali to form a silanol compound. The thus obtained silanol compound is polycondensed in the presence of a known polycondensation catalyst such as an inorganic acid or an organic acid to form an aqueous dispersion of polyorganosiloxane. In order to obtain a stable aqueous dispersion with smaller mean particle size, it is preferable to add a suitable surfactant to the above described hydrolyzation system and the polycondensation system. Many kinds of known anionic, nonionic and cationic surfactants can be used. To the obtained polyorganosiloxane aqueous dispersion, the above-described vinyl monomer and a known radical polymerization catalyst such as a persulfuric acid salt is added to conduct grafting or graft copolymerization under an inert atmosphere. Thus polyorganosiloxane in which vinyl monomer blocks or vinyl polymer blocks have been introduced is obtained.

In the present invention, the above polysiloxanepolyvinyl graft copolymer can be used in the form of an aqueous solution or dispersion or a mixture with a water-dispersible hydrophilic polymer.

Water is used as a solvent for the coating liquid. An alcohol, a cellosolve, N-methylpyrolidone, etc. can be added to the coating liquid for the improvement of stability of the coating liquid against coagulation, coating property, film formation of applied liquid, etc.

The above described hydrophilic polymers used in the present invention is not limited to specific species. Any of them which can dissolve or disperse in water can be used. Out of those listed in "Suiyosei Kobunshi Mizubunsangata Jushi Sogo Gijutsu Shiryoshu (Comprehensive Technical Handbook for Water-Soluble and Water-Dispersible High Polymers" published by Keiei Kaihatsu Senta, Jan. 23, 1981. some examples are starch, cellulose derivatives such as methylcellulose, hydroxyethylcellulose, etc.; and water-soluble or emulsifiable, or suspendable high polymers such as alginic acid, gum arabic, gelatin, sodium polyacrylate, polyacrylamide, polyvinyl alcohol, polyoxy(ethylene oxide), poly(vinyl pyrolidone), poly(vinyl chloride), poly(vinylidene chloride), poly(vinyl acetate), polyolefin resins, urethane resins, acrylic resins, ether resins, epoxy resins, polyester resins, etc. Especially, hydrophilic resins having good adhesiveness to polyester films are preferable. For instance, urethane resins, acrylic resins, polyester resins and copolymers thereof are preferred but not limited thereto. These substances can be used alone or in combination.

In the present invention, a crosslinking agent can be added to the coating liquid. When the coating liquid is used for thermal transfer materials, use of the crosslinker enables the formation of a coating layer which does not soften even when heated by the thermal head. This advantage is due of the crosslinked structure which also increases the non-sticking effect. Also, solvent resistance, water resistance, non-stickiness, mechanical strength, etc. are improved by crosslinking. Examples of the usable crosslinking agent are compounds such as alkylated urea, melamine, guanamine, acrylamide, polyamide; epoxy compounds, azilidine compounds, polyisocyanates, silane coupling agents, titanium coupling agents, zircoaluminate coupling agents, peroxides, photoreactive vinyl compounds, photosensitive resins, etc. These can be used respectively alone or two or more can be used in combination.

The coating liquid in accordance with the present invention can contain organic high polymer particles, inorganic fine particles, etc. for the improvement of non-stickiness and slipperiness. Also, it can contain electrically conductive powder such as powders of metals, metal oxides, electrically conductive carbon black; surfactants, etc. for the prevention of electrification or the buildup of static charge. Further, the coating liquid component of the invention can contain one or more of a defoamer, coat improver, thickener, organic lubricant, anti-oxidant, UV absorber, dye, pigment, etc. as required.

The above-described coating liquid can be applied to polyester films by means of a coating apparatus such as a reverse roll coater, gravure coater, rod coater, air doctor coater or other coaters as described in "Kotingu Hoshiki (Coating Methods)" by Yuji Harasaki, Maki Shoten, 1979. The polyester film coated with the coated liquid in accordance with the present invention is biaxially stretched sequentially or simultaneously. Alternatively a polyester film is stretched in one direction, coated with the coating liquid and further stretched in the direction perpendicular to the previous stretching direction. As a further alternative according to the invention, a biaxially stretched polyester film is coated and thereafter further stretched longitudinally or transversely.

The above described stretching is carried out preferably at 60°–180° C. The stretching ratio is at least 4 times in area, and preferably 6–20. The stretched film is usually heat-treated at 150°–260° C. It is preferable to relax the heat-treated film at the highest temperature zone of the heat treatment or in the cooling section at the exit of the heat treatment zone by 0.1–30% longitudinally or transversely.

An especially preferred process is as follows. A polyester film is stretched by roll stretching at 60°–180° C. by a factor of 2–6 in one direction. The thus treated film is coated and is subjected, after drying or without drying, to the stretching of the direction perpendicular to the previous stretching direction by a factor of 2–6. Thereafter, the film is heat-treated for 1–600 seconds at 150°–260° C.

In the above process, drying of the coated film can be effected simultaneously with stretching. This simultaneously results in simplification and acceleration of process steps, which will bring about cost reduction. The thickness of the coating layer can be easily reduced in accordance with stretching ratio. It is important to keep the coating layer as thin as possible and as uniform as possible because the mold release property and slipperiness are chemical and physical phenomena on the surface of the film. A thick coating layer is inferior in adhesion to the polyester film and apt to cause sticking and transfer to the back side of the film when the film is wound up. When a biaxially stretched film is coated, such thin and uniform application is difficult. According to the above process, however, such application is easy.

The above described process enables formation of a coating layer which has excellent adhesion to the polyester substrate film and is provided with excellent properties of mold releasing, slipperiness and heat-resistance and does not stick to the back side when the film is wound up. The compounds of the present invention do not cause deterioration of flatness and thermal constriction, because the high temperature heat treatment can be easily effected in comparison with the prior art process in which a usual biaxially stretched polyester film is coated.

It is preferred to subject the starting polyester film to a chemical pretreatment or electric discharge treatment prior to coating in order to secure good coatability and adhesiveness.

In the present invention, the thickness of the coating layer is preferably 0.005–3 μm, more preferably 0.01–1 μm. It is difficult to form a film of a uniform thickness at the level of 0.005 μm. Irregularity in thickness easily occurs. With a thickness of more than 3 μm, adhesion to the substrate film and slipperiness will be inferior and blocking may be caused.

When the coated biaxially stretched polyester film is used as a thermal transfer printing material, a thermal transfer printing ink layer is provided on the surface opposite to the coating layer. The thermal transfer printing ink layer comprises a coloring agent and a binder. In the case of the hot melt thermal transfer, a pigment such as carbon black and various dyes used in the field of copying machines can be used. For binders, a mixture comprising a wax as a main ingredient, another wax and a dry oil, a mixture of cellulose and a rubber derivative, etc. can be used. In the case of sublimation type thermal transfer, sublimation dyes such as azo dyes, anthraquinone dyes, etc. can be used and methylcellulose, ethylcellulose, cellulose acetate, polyvinylbutyral, polysulfon, polyallylate, etc. can be used as a binder.

If the adhesion of the thermal transfer ink layer to the biaxially stretched polyester film is poor, chemical treatment, electric discharge treatment or a primer coating can be applied to the substrate.

When the film is used as a friction sheet, the film is punched in a desired shape, and placed in a cassette so that the coating layer may contact the side edge of the wound tape.

When the coated polyester film of the present invention is used as transfer printing foil, a transfer layer is provided on the surface of the coating layer. The transfer layer comprises a picture layer, an adhesive layer and a protective layer, which protects the transferred picture layer. These layers are formed on the coating layer in the order of the protective layer, the picture layer and the adhesive layer. On the picture layer, any desired color, a pattern, characters, etc. are printed by gravure printing, silk screen printing, offset printing, etc. Any ordinary printing ink can be used. Examples of the adhesive usable for the adhesive layer are acrylic resins, vinyl chloride resins, urethane resins, epoxy resins, etc. They can be used alone or as a mixture.

SPECIFIC DISCLOSURE OF THE INVENTION

Now the invention will be specifically described in detail. However, the invention is not limited to the following working examples only but limited by the claimed gist of the invention.

The methods of measurements of characteristic and effect in the present invention are as follows.
(1) Particle size Particle size of the polysiloxane-polyvinyl graft copolymer was measured by the light scattering method using a light scattering measurement apparatus "ELS-800" manufactured by Otsuka Denshi Kabushiki Kaisha.
(2) Adhesion of coating layer A cellophane tape 18 mm in width was applied on the surface of a coating layer over a length of 5 cm. A 3 kg load was applied on the tape by a manual load roller to press the tape tightly to the surface. Then the cellophane tape was pulled perpendicularly.

Evaluation of adhesion was as follows.
◯: Coating of less than 10 % was transferred to tape.
Δ: 10–50% was transferred to tape.
×: More than 50% was transferred to tape.
(3) Repellence of ink layer and adhesion of ink layer On the top of the coating layer of a coated polyester film, a polyester film having no thermal transfer layer was laid over, and hot wet press was carried out with a 10 kg/cm$^2$ load at 40° C. and 80% RH for 20 hours. Thereafter, the polyester substrate sheet was separated and a thermal transfer printing ink comprising 60 parts of a polyester resin dispersion, 40 parts of carbon black dispersion and having a 30 wt % concentration was applied on the polyester substrate sheet so as to form a 2.5 μm thick thermal transfer layer. Repellence of the thermal transfer printing ink was visually observed. Further, the obtained thermal transfer printing material was crumpled by hands and peel-off of the thermal transfer printing ink was visually observed.

Evaluation was as follows.
(i) Repellence of ink layer
◯: Uniformly applied and no repellence of ink
Δ: Repellence observed in places
×: Repellence observed overall
(ii) Adhesion of ink layer
◯: No peel-off
Δ: Peel-off in less than 50% area
×: Peel-off in more than 50% area
(4) Resistance to sticking of thermal transfer material Resistance to sticking was evaluated using a line type thermal head under the following conditions.
Recording density: 4 dots/mm
Recording power: 0.7 W/dot
Head heating time: 4–10 msec
Evaluation was as follows.
◯: No sticking
Δ: Slight sticking
×: Remarkable sticking impairing running of tape
(5) Transfer of friction sheet to backside On the surface of a polyester substrate sheet, a coating layer was laid over and hot wet press was carried out with a 10 kg/cm$^2$ at 40° C. and 80% RH for 20 hours. A thin line was drawn on the polyester substrate sheet with a marking pen. Repellence was visually observed.

Evaluation was as follows.
◯: No repellence
Δ: Slight repellence
×: Repellence observed overall
(6) Running of audio cassette tape The friction sheet of a commercial audio cassette tape recorder (Sony "UX") was removed from the apparatus and replaced with the film of the present invention of the same shape. The running of the tape was observed.

Evaluation was as follows.
◯: Smooth running
×: Irregular running
(7) Transfer of transfer foil On the surface of a decorative acryl resin plate, a transfer foil was laid over with the transfer surface facing to the acryl resin plate. The two were pressed together by means of a hot roller the surface temperature of which was 200° C. Thereafter, the substrate polyester sheet was removed and the transfer property was evaluated.

○: Transfer layer and coating layer separate with good peel-off load

Δ: Transcription layer and coating layer locally adhered and the transcription surface was poor X: Transcription layer and coating layer adhered and separation was difficult.

EXAMPLE 1

Octamethylcyclotetrasiloxane (97.7 g), 4.6 g of gamma-glycidoxypropyltrimethoxisilane and 2.0 g of gamma-methacryloxy-propoyltrimethoxysilane were mixed and 300 g of deionized water in which 1.0 g of dodecylbenzene sulfonic acid was dissolved was added to the mixture and the resulting mixture was dispersed by a homomixer. The mixture was further emulsified by a homogenizer. Thus an aqueous dispersion of a silanol compound was obtained. In a flask, 31 g of dodecylbenzenesulfonic acid and 217 g of an deionized water were placed and dissolved well and the mixture was heated to 80°-85° C. To this mixture, the above described aqueous dispersion of silanol compound was added dropwise over a period of 2 hours. After the addition was finished, the reaction mixture was aged at 85° C. for 1 hour. Thereafter, the mixture was cooled to room temperature and neutralized with sodium carbonate to terminate the polycondensation. Thus an aqueous dispersion of polyorganosiloxane was obtained. Finally, 483 g of deionized water and 1.5 g of persulfuric acid were added to this dispersion. The mixture was transferred to another flask, which was blanketed by introduction of nitrogen stream and warmed to 70° C. Methyl methacrylate (50 g) and 50 g of ethyl acrylate were slowly added dropwise and the reaction mixture was aged for 3 hours after the andiron was finished. Thus an aqueous dispersion of polysiloxane polyvinyl graft copolymer was obtained. The solid content of this dispersion was 19.1 wt %, the mean particle diameter was 0.06 μm.

A poly(ethylene terephthalate).(intrinsic viscosity: 0.65) containing 0.2 wt % of amorphous silica having a mean particle diameter of 1.3 μm was melt-extruded at 285° C., cast onto a cooling drum of 60° C. with the aid of the electrostatic pinning. The extruded polyester was longitudinally stretched at 95° C. by a factor of 3.5. The longitudinally stretched film was subjected to corona discharge in the air and the thus treated polyester film was coated with the above described graft copolymer, transversally stretched at 110° C. by a factor of 4.0 and and heat-treated at 230° C. for heat setting. Thus a polyester film having a thickness of 6 μm and thereon, which coating layer has a coating layer having a thickness of 0.1 μm was obtained. On the opposite side of the coating layer of this film, a hot-melt transfer ink having a composition given below was applied with a coating weight of 2 g/mm² by hot-melt coating.

| (Compositionn of hot-melt transfer ink) | |
| --- | --- |
| Carbon black | 20 parts by weight |
| Praffin wax | 40 parts by weight |
| Carnaba wax | 30 parts by weight |
| Ethylene-vinyl acetate copolymer | 10 parts by weight |

EXAMPLE 2

Ninety (90) parts (as the solid content in the coating liquid) and 10 parts by weight of methylol melamine were mixed to obtain a coating liquid and the procedures were repeated in the same manner as in Example 1. Thus another thermal transcription material was obtained. EXAMPLE 3

Repeating the procedures of the preparation of the graft copolymer in Example 1 using 25 g of methyl methacrylate and 25 g of ethyl acrylate as the starting materials for vinyl polymer block, another graft copolymer was obtained.

Ninety (90) parts of this graft copolymer and 10 parts of methylol melamine were mixed and a coating liquid was prepared. In the same manner as in Example 1, another thermal transfer material was obtained.

EXAMPLE 4

Sixty-five (65) parts of the graft copolymer obtained in Example 1, 15 parts of an aqueous dispersion of poly-(ethylene oxide) having a mean molecular weight of 1900, a melting point of 91° C. (by differential thermal analysis) and a melt viscosity of 200 cps (140° C.) and 20 parts of methylol melamine were mixed and a coating liquid was obtained. Using this coating liquid, another thermal transfer material was obtained in the same manner as in Example 1.

EXAMPLE 5

One hundred point six (100.6) g of octamethylcyclotetrasiloxane, 2.0 g of gamma-methacryloxypropylmethyldimethoxysilane and 1.1 g of dodecylbenzenesulfonic acid were dissolved in 315 g of deionized water, the mixture was dispersed by a homomixer and emulsified by a homogenizer. The thus obtained aqueous dispersion was placed in a flask and polycondensation was conducted at 80° C. for 5 hours. The polycondensation product was cooled for 16 hours and neutralized with a saturated sodium carbonate solution containing 0.32 g of sodium carbonate. The thus obtained polyorganosiloxane aqueous dispersion was placed in a flask, 1.6 g of persulfuric acid and 400 g of deionized water were added thereto and the mixture was heated to 70° C. Thereafter, the mixture was blanketed by introducing a nitrogen stream in the flask, 100 g of methyl methacrylate was added dropwise over a period of 2 hours. After the addition was finished, the mixture was heated to 80° C. and aged for 4 hours. Thereafter, the mixture was cooled to 40° C. and filtered. Thus an aqueous dispersion of a graft copolymer. The solid content was 22.2 wt % and the mean particle diameter was 0.32 μm.

Using a coating liquid which comprises 90 parts of the above graft copolymer and 10 parts of methylol melamine, another thermal transfer material was obtained.

EXAMPLE 6

In the same manner as in Example 4, a polyester film having the coating layer was obtained. On the opposite side of the film, an isopropyl alcohol in which an anthraquinone dye "PTR-6" manufactured by Mitsubishi Kasei Corporation was dispersed was applied so as to give a transfer layer having a dry thickness of 2 μm and thus a sublimation type thermal transfer material was obtained.

The thermal transfer materials of Examples 1-6 exhibited good running property in printing without causing sticking. No repellence of the thermal transfer ink occurred and adhesion of the ink layer to the substrate was satisfactory.

Comparative Example 1

A thermal transfer material was prepared in the same manner as in Example 1 except that a coating layer was not provided.

The obtained thermal transfer material developed remarkable sticking and could not run in printing as shown in Table 1.

Comparative Example 2

The procedures of Example 1 were repeated except that a coating liquid comprising 90 parts of an aqueous dispersion of an acryl copolymer of ethyl acrylate, methyl methacrylate and styrene and 10 parts of methylol melamine to obtain a thermal transfer material.

The obtained thermal transfer material exhibited remarkable sticking and could not run in printing.

Comparative Example 3

The procedures of Example 1 were repeated to obtain a thermal transfer except that a coating liquid, which is an aqueous dispersion of epoxy-modified polysiloxane, was used.

Comparative Example 4

Using a coating liquid comprising 70 parts of the acryl copolymer of Comparative Example 2, 20 parts of the polysiloxane dispersion of Comparative Example 3 and 10 parts of methyolol melamine, the procedures of Example 1 were repeated and a thermal transfer material was obtained.

The thermal transfer materials of Comparative Examples 3 and 4 developed repellence of transferred ink and coating properties were poor as indicated in Table 1. The adhesion of the thermal transfer layer was poor.

Comparative Example 5

The procedures of Example 1 were repeated except that 70 parts of an acryl copolymer aqueous dispersion, 20 parts of a fluorine-containing surfactant and 10 parts of methylol melamine of Comparative Example 2 were used and a thermal transfer material was obtained.

The obtained product exhibited repellence of the transfer ink and the coatability was poor and the adhesion of the thermal transfer ink layer was poor as indicated in Table 1. Also, sticking occurred and the tape did not run smoothly in the printing apparatus.

Comparative Example 6

The graft copolymer of Example 1 was applied to a biaxially stretched film having a thickness of 6 82 m and dried at 100° C. and a coating layer of 0.1 μm was formed. On the opposite side of the thus formed coating layer, the graft copolymer of Example 1 was applied to form a 0.1 μm thick coating layer. On the opposite side of this film, a thermal transfer ink layer was prepared and a thermal transfer material was obtained.

The obtained thermal transfer material was poor in flatness because of thermal constriction and adhesion to the polyester base film as indicated in Table 1 and sticking occurred and the adhesion of the thermal transfer ink was poor.

EXAMPLES 7 and 8

Coated polyester films were obtained in the same manner as in Examples 2 and 3 except that the thickness of the base film was 38 μm. The dynamic friction coefficients between the coating layers of these films and the surface of the polyester films were 0.12 and 0.11.

As indicated in Table 2, the tape in an audio cassette tape recorder, in which a friction sheet made of this coated friction film was used, ran smoothly and was uniformly wound.

Comparative Example 7

A polyester film was prepared in the same manner as in Example 7 except that the base film was not coated. The dynamic friction coefficient of the thus obtained polyester film was 0.42.

The tape in an audio cassette tape recorder, in which a friction sheet made of this coated friction film was used, did not run smoothly and the film was found unusable as a friction sheet.

Comparative Examples 8 and 9

Coated polyester films were obtained in the same manner as in Comparative Examples 4 and 5 except that the thickness of the base film was 38 μm. The dynamic friction coefficients between the coating films of these films and the surface of the polyester films were 0.14 and 0.18.

These films exhibited remarkable sticking of the coating layer to the backside of the film and repellence of marking ink occurred.

EXAMPLES 9 and 10

Polyester films were obtained in the same manner as in Examples 2 and 3. On the coating layer of the obtained films, an acrylic resin varnish "Hakuri Nisu 35T" marketed by Showa Inku Kogyo Kabusiki Kaisha was applied to a thickness of 2 μm, a picture pattern was printed on these surfaces by the screen printing using an acrylic resin ink "TACS" (marketed by Showa Inku Kogyo Kabusiki Kaisha) and finally an adhesive layer was provided on the picture surfaces by applying an acrylic adhesive "HS-32" marketed by Showa Inku Kogyo Kabusiki Kaisha. Thus, transfer foils were made.

EXAMPLE 11

A transfer foil was prepared exactly in the same manner as in Example 9 except that a coating liquid comprising 70 parts of the graft copolymer of Example 1, 20 parts of an aqueous dispersion of a polyester resin comprising terephthallic acid, isophthalic acid, 5-sodium sulfoisophthalic acid, ethylene glycol and diethylene glycol and 10 parts of methylol melamine was used.

No separation of the transfer layer and the coating layer occurred in the transfer foils of Examples 9–11 in the steps of winding, sending-out, forwarding to the step that follows, etc. other than the transfer printing operation. That is, these transfer foils had suitable adhesiveness and the transfer layer was transferred with a proper load at transfer printing.

Comparative Example 10

Exactly in the same manner as in Example 9, but not forming a coating layer, a transfer foil was obtained.

The transfer performance was evaluated. The transfer foil and the film were bonded and could not be separated.

Comparative Example 11

On one side of a biaxially stretched polyethylene terephthalate film having a thickness of 38 μm, the polysiloxane aqueous dispersion obtained in Comparative Example 3 was applied and dried at 100° C. and a coating layer of 0.1 μm was formed. On the surface thereof a transfer layer was provided in the same manner as in Example 9.

This transfer foil is inferior in adhesion of transfer layer and coating layer and the two separated in the film winding step, etc. (i.e. other than transfer operation). Transfer property was excessively good and peripheral area was also-separated to form so-called "fins".

TABLE 1

|  | Adhesion of coating | Repellence of ink layer | Adhesion of ink layer | Resistance to sticking |
|---|---|---|---|---|
| Ex. 1 | ○ | ○ | ○ | ○ |
| Ex. 2 | ○ | ○ | ○ | ○ |
| Ex. 3 | ○ | ○ | ○ | ○ |
| Ex. 4 | ○ | ○ | ○ | ○ |
| Ex. 5 | ○ | ○ | ○ | ○ |
| Ex. 6 | ○ | ○ | ○ | ○ |
| Comp. Ex. 1 | — | ○ | ○ | X |
| Comp. Ex. 2 | ○ | ○ | ○ | X |
| Comp. Ex. 3 | ○ | X | X | Δ |
| Comp. Ex. 4 | ○ | X | X | ○ |
| Comp. Ex. 5 | ○ | X | X | X |
| Comp. Ex. 6 | X | Δ | Δ | Δ |

TABLE 2

|  | Sticking to backside | Running property |
|---|---|---|
| Ex. 7 | ○ | ○ |
| Ex. 8 | ○ | ○ |
| Comp. Ex. 7 | ○ | X |
| Comp. Ex. 8 | X | ○ |
| Comp. Ex. 9 | X | X |

The polyester film of the present invention is inexpensive and excellent in mold release property, slipperiness, heat resistance and flatness. In addition, the film hardly causes sticking and transfer of the coated layer to the back side of the film and, accordingly, it is free from troubles such as degradation of printing quality caused by such sticking or transfer. The film of the present invention is usable in a base film of thermal transfer printing material, transfer printing foil and the like and is useful in various industrial applications.

What we claim is:

1. A coated polymer film comprising
(A) a polyester film, and on at least one surface of said film,
(B) a coating of a polysiloxane-polyvinyl graft copolymer,
wherein the polysiloxane portion of said polysiloxane-polyvinyl graft copolymer comprises structural units of the formulas (1), (2) and (3)

$$R^1{}_n SiO_{(4-n)/2} \quad (1)$$

$$R^2{}_m SiO_{(3-m)/2}\text{—A—B} \quad (2)$$

$$(CH_3)_2 SiO_{2/2} \quad (3)$$

and in which the structural units of formula (3) are present in an amount of not less than 80 wt % of the polysiloxane portion,
wherein the thickness of said coating on said film is 0.005–3 μm; and
wherein $R^1$ and $R^2$ are independently an unsubstituted or substituted hydrocarbyl group wherein said hydrocarbyl group has a carbon atom directly connected to the Si atom and has no radical polymerizability; n is 1 or 2, and when n is 2, the $R^1$ groups are identical or non-identical; m is 0 or 1; A is a divalent organic group which has a carbon directly connected to the Si atom and is connected to the group B; and B is a vinyl polymer block obtained by grafting at least one monomer selected from the group consisting of aromatic vinyl monomers, alkyl esters of acrylic acid and alkyl esters of methacrylic acid.

2. The polyester film of claim 1, wherein the thickness of said coating on said film is 0.005–2.0 μm.

3. The polyester film of claim 1, wherein the thickness of said coating on said film is 0.005–1.0 μm.

4. The polyester film of claim 1, wherein the thickness of said coating on said film is 0.010–1.0 μm.

5. The polyester film of claim 1, wherein the ratio of the polysiloxane portion to the vinyl polymer portion is in the range of from 100:5 to 100:1000 by weight.

6. The polyester film of claim 1, wherein the ratio of the polysiloxane portion to the vinyl polymer portion is in the range of from 100:5 to 100:500 by weight.

7. The polyester film of claim 1, wherein the structural units of formula (3) are present in an amount of not less than 85 wt % of the polysiloxane portion.

8. The polyester film of claim 1, wherein the structural units of formula (3) are present in an amount of not less than 90 wt % of the polysiloxane portion.

9. A coated polyester film prepared by the process of
(A) applying, to at least one surface of a polyester film, an aqueous solution or dispersion containing a polysiloxane-polyvinyl graft copolymer, so as to form a coating on said film,
wherein the polysiloxane portion of said polysiloxane-polyvinyl graft copolymer comprises structural units of the formulas (1), (2) and (3)

$$R^1{}_n SiO_{(4-n)/2} \quad (1)$$

$$R^2{}_m SiO_{(3-m)/2}\text{—A—B} \quad (2)$$

$$(CH_3)_2 SiO_{2/2} \quad (3)$$

and in which the structural units of formula (3) are present in an amount of not less than 80 wt % of the polysiloxane portion, and, thereafter,
(B) stretching and drying said film so that the thickness of said coating is 0.005–3 μm;
wherein $R^1$ and $R^2$ are independently an unsubstituted or substituted hydrocarbyl group wherein said hydrocarbyl group has a carbon atom directly connected to the Si atom and has no radical polymerizability; n is 1 or 2, and when n is 2, the $R^1$ groups are identical or non-identical; m is 0 or 1; A is a divalent organic group which has a carbon directly connected to the Si atom and is connected to the group B; and B is a vinyl polymer block obtained by grafting at least one monomer selected from the group consisting of aromatic vinyl monomers, alkyl esters of acrylic acid and alkyl esters of methacrylic acid.

10. The product of claim 9, wherein the graft copolymer is formed by the step of (I) polycondensing units of formulas (1) and (2), to make polyorganosiloxane.

11. The polyester film of claim 1 further comprising an antistatic compound.

12. The polyester film of claim 1, wherein said coating further comprises one or more from the group consisting of metallic powders, metal oxides, electrically conductive carbon black, and surfactants.

13. The polyester film of claim 1, wherein said coating further comprises one or more from the group consisting of defoaming compounds, organic lubricants, anti-oxidizing compounds, UV-absorbing compounds, dyes, and pigments.

* * * * *